US012634995B2

(12) United States Patent
Ganti et al.

(10) Patent No.: US 12,634,995 B2
(45) Date of Patent: May 19, 2026

(54) SELECTING SYNCHRONIZATION BEAMS TO REDUCE LATENCY

(71) Applicant: QUALCOMM Incorporated, San Diego, CA (US)

(72) Inventors: Kamalakar Ganti, San Diego, CA (US); Anindya Majumder, San Diego, CA (US); Ammar Kitabi, San Diego, CA (US); Jun Hu, San Diego, CA (US); Ling Xie, Beijing (CN); Qingxin Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 18/262,369

(22) PCT Filed: Apr. 1, 2021

(86) PCT No.: PCT/CN2021/084884
§ 371 (c)(1),
(2) Date: Jul. 20, 2023

(87) PCT Pub. No.: WO2022/205293
PCT Pub. Date: Oct. 6, 2022

(65) Prior Publication Data
US 2024/0080901 A1 Mar. 7, 2024

(51) Int. Cl.
*H04W 74/0833* (2024.01)
*H04B 7/08* (2006.01)
*H04W 88/06* (2009.01)

(52) U.S. Cl.
CPC ........ *H04W 74/0833* (2013.01); *H04B 7/088* (2013.01); *H04W 88/06* (2013.01)

(58) Field of Classification Search
CPC ............. H04W 74/0833; H04W 88/06; H04W 56/0015; H04W 74/002; H04B 7/088; H04B 7/022
See application file for complete search history.

(56) References Cited

U.S. PATENT DOCUMENTS 10,034,320 B2 7/2018 Shi et al.
10,966,168 B1 * 3/2021 Krishnamoorthy ... H04W 24/08
(Continued)

FOREIGN PATENT DOCUMENTS

CN 109691219 4/2019
CN 111107553 A 5/2020
(Continued)

OTHER PUBLICATIONS

Supplementary European Search Report—EP21933952—Search Authority—Munich—Nov. 19, 2024.
(Continued)

*Primary Examiner* — Jae Y Lee
(74) *Attorney, Agent, or Firm* — QUALCOMM Incorporated

(57) ABSTRACT

Methods, systems, and devices for wireless communication are described. A user equipment (UE) may be configured with two subscriber identity modules (SIMs). The UE may select a synchronization beam associated with a random access occasion of a first SIM based on the random access occasion not overlapping in time with a reception opportunity (e.g., a paging occasion) of the second SIM. In some examples, the UE may select the synchronization beam based on an identified signal quality of the synchronization beam (e.g., in comparison to other available synchronization beams that are non-overlapping with the reception opportunity). The UE may perform a random access procedure (e.g., using the first SIM) during the random access occasion associated with the selected synchronization beam and, in (Continued)

Random Access Occasion Period 315

SSB0 SSB1 SSB2 SSB3 SSB4 SSB5 SSB6 SSB7 SSB0 SSB1
305-a 305-b 305-c 305-d 305-e 305-f 305-g 305-h 305-i 305-j

Random Access Opportunities 301

Time 10 ms

Reception Opportunity 310

Time

▨ Colliding Random Access Occasions
▦ Non-colliding Random Access Occasions
▥ Subsequent non-colliding Random Access Occasions

300 some cases, may also monitor (e.g., using the second SIM) resources associated with the paging opportunity.

30 Claims, 10 Drawing Sheets

(56) References Cited

U.S. PATENT DOCUMENTS

| | | | | |
|---|---|---|---|---|
| 2020/0404620 | A1* | 12/2020 | Sang | H04W 24/10 |
| 2021/0100029 | A1* | 4/2021 | Lei | H04W 72/0446 |
| 2022/0408478 | A1* | 12/2022 | Christoffersson | |
| | | | | H04W 74/0833 |

FOREIGN PATENT DOCUMENTS

| | | | |
|---|---|---|---|
| WO | WO-2018052548 | 3/2018 | |
| WO | WO-2020186092 A2 | 9/2020 | |
| WO | WO-2022067285 A1 * | 3/2022 | ......... H04B 7/06952 |

OTHER PUBLICATIONS

International Search Report and Written Opinion—PCT/CN2021/084884—ISA/EPO—Jan. 4, 2022.

Vivo, et al., "Discussion on SA2/RAN Work Split for Key Issue#2 and Related TP," SA WG2 Meeting #136AH, S2-2000133, Jan. 13-17, 2020, (Jan. 17, 2020), Incheon, Korea, 9 pages, the whole document.

* cited by examiner

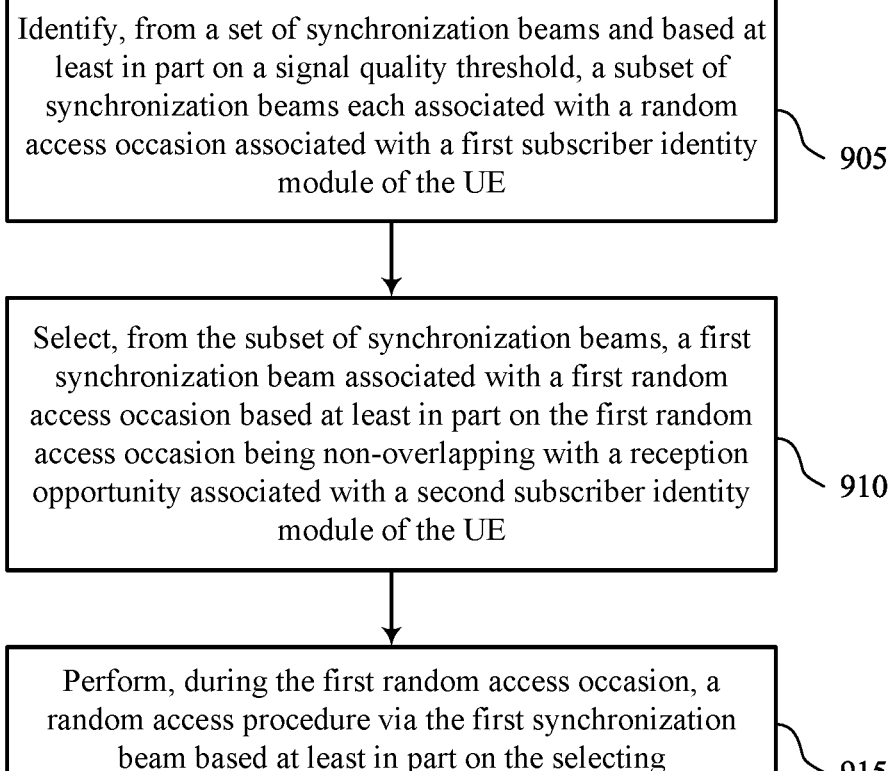

Identify, from a set of synchronization beams and based at least in part on a signal quality threshold, a subset of synchronization beams each associated with a random access occasion associated with a first subscriber identity module of the UE

905

Select, from the subset of synchronization beams, a first synchronization beam associated with a first random access occasion based at least in part on the first random access occasion being non-overlapping with a reception opportunity associated with a second subscriber identity module of the UE

910

Perform, during the first random access occasion, a random access procedure via the first synchronization beam based at least in part on the selecting

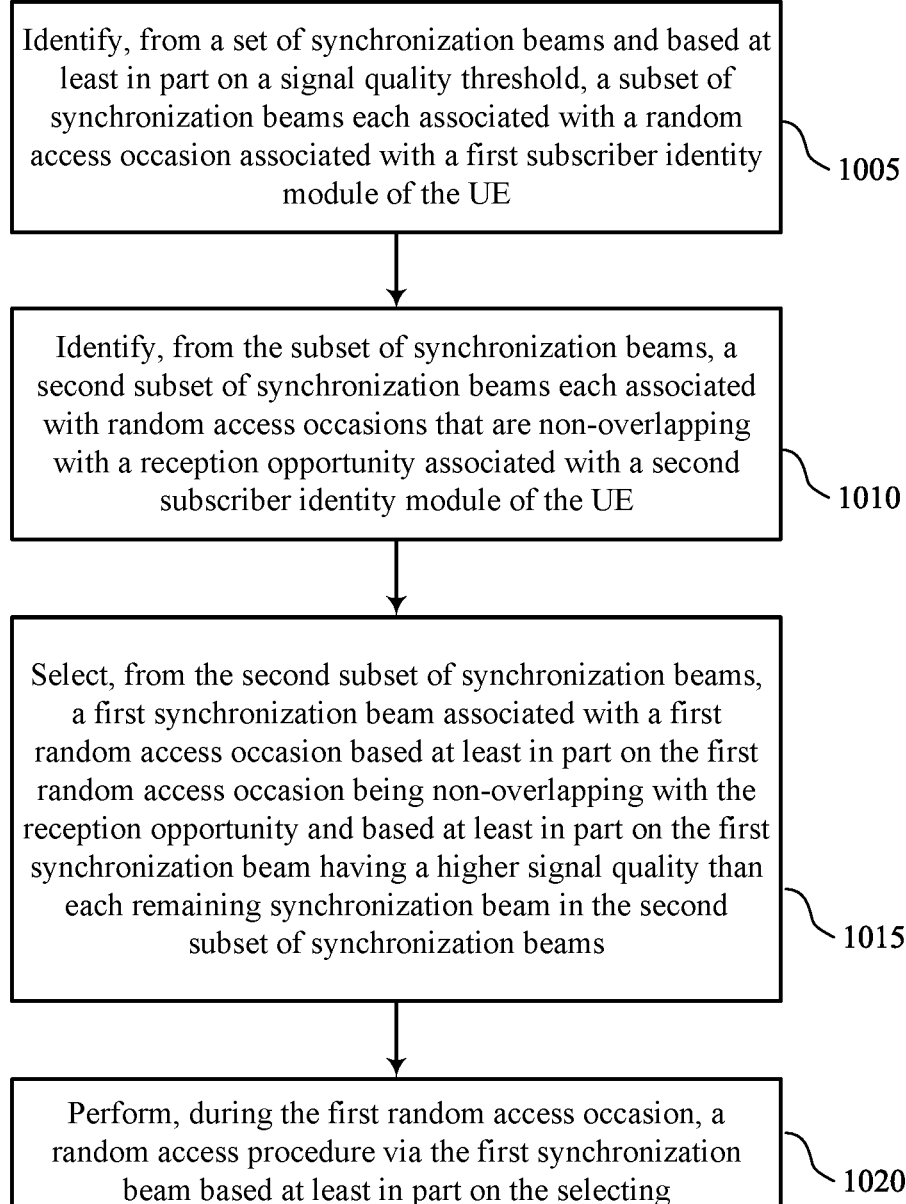

Identify, from a set of synchronization beams and based at least in part on a signal quality threshold, a subset of synchronization beams each associated with a random access occasion associated with a first subscriber identity module of the UE

1005

Identify, from the subset of synchronization beams, a second subset of synchronization beams each associated with random access occasions that are non-overlapping with a reception opportunity associated with a second subscriber identity module of the UE

1010

Select, from the second subset of synchronization beams, a first synchronization beam associated with a first random access occasion based at least in part on the first random access occasion being non-overlapping with the reception opportunity and based at least in part on the first synchronization beam having a higher signal quality than each remaining synchronization beam in the second subset of synchronization beams

1015

Perform, during the first random access occasion, a random access procedure via the first synchronization beam based at least in part on the selecting

SELECTING SYNCHRONIZATION BEAMS TO REDUCE LATENCY

CROSS REFERENCE

The present Application is a 371 national stage filing of International PCT Application No. PCT/CN2021/084884 by GANTI et al. entitled "SELECTING SYNCHRONIZA-TION BEAMS TO REDUCE LATENCY," filed Apr. 1, 2021, which is assigned to the assignee hereof, and which is expressly incorporated by reference in its entirety herein.

FIELD OF TECHNOLOGY

The following relates to wireless communication, includ-ing selecting synchronization beams to reduce latency.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wire-less multiple-access communications system may include one or more base stations or one or more network access nodes, each simultaneously supporting communication for multiple communication devices, which may be otherwise known as user equipment (UE).

Some UEs may have multiple subscriber identity modules (SIMs) to communicate with multiple networks. For instance, a UE may have a first SIM for communicating via a first radio access technology (RAT) (e.g., NR) and a second SIM for communicating via a second RAT (e.g., LTE). In some cases, the UE may have limited resources, components, or other constraints, and may not be capable of using both SIMs simultaneously. For example, a dual-SIM dual-standby (DSDS) UE may use both SIMs while in idle mode, but may only have one active network connection at a time. Such constraints may introduce delays and increase latency in the system.

SUMMARY

The described techniques relate to improved methods, systems, devices, and apparatuses that support selecting synchronization beams to reduce latency. Generally, the described techniques provide for reducing latency when a user equipment (UE) has two subscriber identification mod-ules (SIMs). The UE may select a transmission opportunity associated with a first SIM based on the transmission opportunity not overlapping (e.g., in the time domain) with a reception opportunity associated with a second SIM. For example, the UE may select a synchronization beam asso-ciated with a random access occasion of the first SIM based on the random access occasion not overlapping in time with a paging opportunity of the second SIM. In some examples, the UE may further select the synchronization beam based on an identified signal quality of the synchronization beam. That is, the UE may identify the random access occasions that do not overlap with a paging opportunity and may select, from the identified nonoverlapping paging opportu-nities, the paging opportunity associated with a synchroni-zation beam that has the highest signal quality from the synchronization beams associated with the other identified nonoverlapping random access occasions. The UE may perform a random access procedure (e.g., using the first SIM) during the random access occasion associated with the selected synchronization beam and, in some cases, may also monitor (e.g., using the second SIM) resources associated with the paging opportunity.

A method for wireless communication at a UE is described. The method may include identifying, from a set of synchronization beams and based on a signal quality threshold, a subset of synchronization beams each associ-ated with a random access occasion associated with a first SIM of the UE, selecting, from the subset of synchronization beams, a first synchronization beam associated with a first random access occasion based on the first random access occasion being non-overlapping with a reception opportu-nity associated with a second SIM of the UE, and perform-ing, during the first random access occasion, a random access procedure via the first synchronization beam based on the selecting.

An apparatus for wireless communication at a UE is described. The apparatus may include a processor, memory coupled with the processor, and instructions stored in the memory. The instructions may be executable by the proces-sor to cause the apparatus to identify, from a set of synchro-nization beams and based on a signal quality threshold, a subset of synchronization beams each associated with a random access occasion associated with a first SIM of the UE, select, from the subset of synchronization beams, a first synchronization beam associated with a first random access occasion based on the first random access occasion being non-overlapping with a reception opportunity associated with a second SIM of the UE, and perform, during the first random access occasion, a random access procedure via the first synchronization beam based on the selecting.

Another apparatus for wireless communication at a UE is described. The apparatus may include means for identifying, from a set of synchronization beams and based on a signal quality threshold, a subset of synchronization beams each associated with a random access occasion associated with a first SIM of the UE, means for selecting, from the subset of synchronization beams, a first synchronization beam asso-ciated with a first random access occasion based on the first random access occasion being non-overlapping with a reception opportunity associated with a second SIM of the UE, and means for performing, during the first random access occasion, a random access procedure via the first synchronization beam based on the selecting.

A non-transitory computer-readable medium storing code for wireless communication at a UE is described. The code may include instructions executable by a processor to iden-tify, from a set of synchronization beams and based on a signal quality threshold, a subset of synchronization beams each associated with a random access occasion associated with a first SIM of the UE, select, from the subset of synchronization beams, a first synchronization beam asso-ciated with a first random access occasion based on the first random access occasion being non-overlapping with a reception opportunity associated with a second SIM of the UE, and perform, during the first random access occasion, a random access procedure via the first synchronization beam based on the selecting.

Some examples of the method, apparatuses, and non-transitory computer-readable medium described herein may further include operations, features, means, or instructions for identifying, from the subset of synchronization beams, a second subset of synchronization beams each associated with random access occasions that may be non-overlapping with the reception opportunity, where selecting the first synchronization beam includes selecting the first synchronization beam from the second subset of synchronization beams.

In some examples of the method, apparatuses, and non-transitory computer-readable medium described herein, selecting the first synchronization beam may include operations, features, means, or instructions for selecting the first synchronization beam based on the first synchronization beam having a higher signal quality than each remaining synchronization beam in the second subset of synchronization beams.

In some examples of the method, apparatuses, and non-transitory computer-readable medium described herein, selecting the first synchronization beam may include operations, features, means, or instructions for selecting the first synchronization beam based on the first random access occasion associated with the first synchronization beam having a shorter time delay than random access occasions associated with each remaining synchronization beam in the second subset of synchronization beams.

Some examples of the method, apparatuses, and non-transitory computer-readable medium described herein may further include operations, features, means, or instructions for identifying a signal quality associated with each synchronization beam of the set of synchronization beams and comparing the identified signal quality associated with each synchronization beam to the signal quality threshold, where the subset of synchronization beams may be identified based on each synchronization beam of the subset of synchronization beams exceeding the signal quality threshold.

In some examples of the method, apparatuses, and non-transitory computer-readable medium described herein, identifying the signal quality associated with each synchronization beam may include operations, features, means, or instructions for measuring a reference signal receive power associated with each synchronization beam of the set of synchronization beams.

Some examples of the method, apparatuses, and non-transitory computer-readable medium described herein may further include operations, features, means, or instructions for identifying, from the subset of synchronization beams, a second synchronization beam associated with a first signal quality that may be higher than a second signal quality associated with the first synchronization beam, where selecting the first synchronization beam may be based on the second synchronization beam being associated with a second random access occasion that overlaps with the reception opportunity.

Some examples of the method, apparatuses, and non-transitory computer-readable medium described herein may further include operations, features, means, or instructions for monitoring, using the second SIM of the UE, resources associated with the reception opportunity based on selecting the first synchronization beam.

In some examples of the method, apparatuses, and non-transitory computer-readable medium described herein, the first SIM of the UE may be associated with a new radio (NR)

radio access technology and the second SIM of the UE may be associated with an NR radio access technology, a long-term evolution (LTE) radio access technology, a wideband code division multiple access (WCDMA) radio access technology, or a 1x radio access technology.

In some examples of the method, apparatuses, and non-transitory computer-readable medium described herein, the reception opportunity includes a paging opportunity associated with the second SIM of the UE.

BRIEF DESCRIPTION OF THE DRAWINGS

FIGS. 9 and 10 show flowcharts illustrating methods that support selecting synchronization beams to reduce latency in accordance with aspects of the present disclosure.

DETAILED DESCRIPTION

Figure 1:
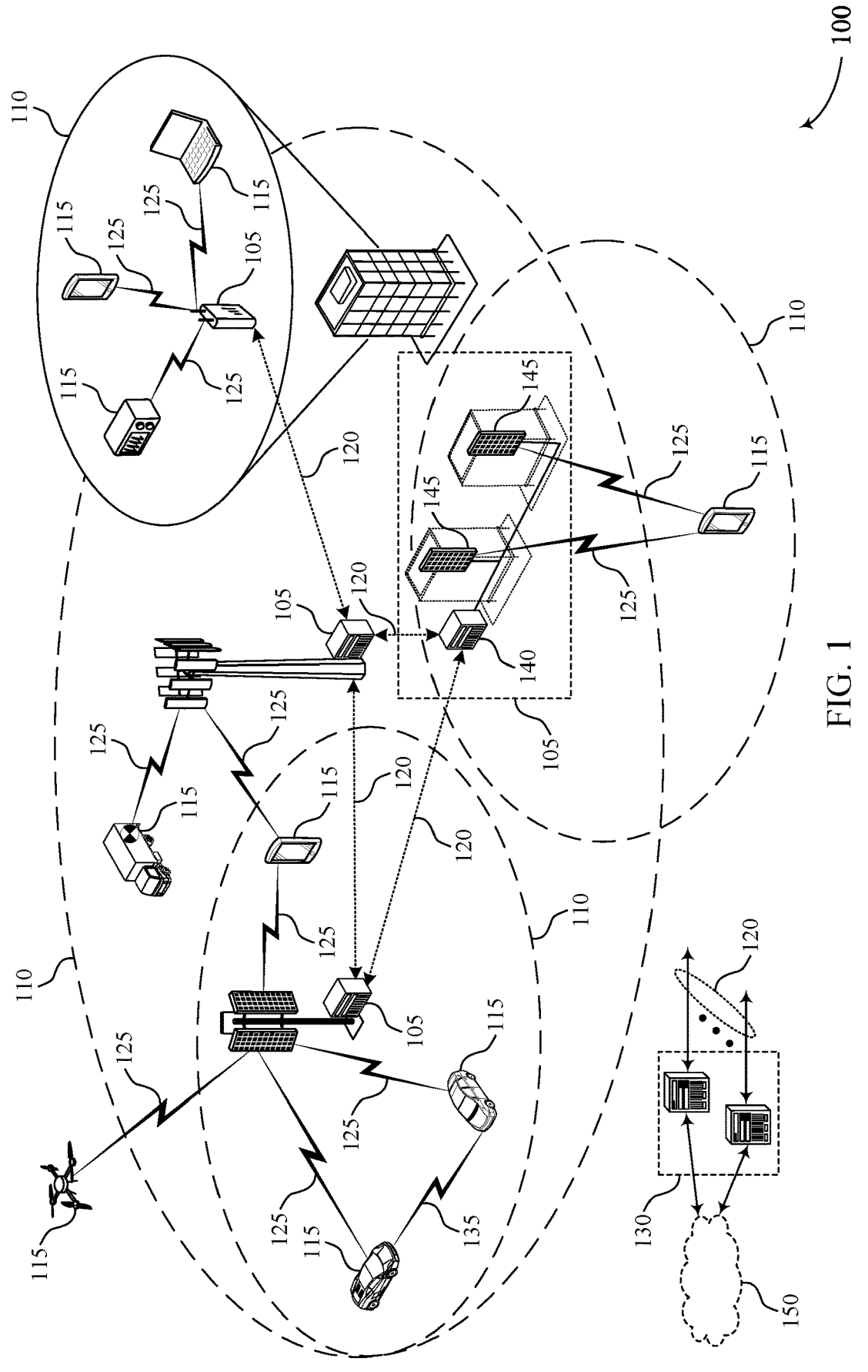
FIG. 1 illustrates an example of a wireless communications system that supports selecting synchronization beams to reduce latency in accordance with aspects of the present disclosure.

Some wireless communications systems may support devices configured with multiple subscribers or subscriptions. For example, a user equipment (UE) may be configured with two subscriber identification modules (SIMs), which may be referred to as a dual-SIM UE. A dual-SIM UE may be capable of communicating with a first subscriber (e.g., via a first radio access technology (RAT)) using a first SIM and a second subscriber (e.g., via a second RAT) using a second SIM. However, some dual-SIM UEs may be configured to communicate using one of the SIMs at a time, for instance, based on a radio frequency component configuration of the UE. In such cases, conflicts between communication opportunities associated with the respective SIMs may occur, and communications with one or both subscribers may be delayed (e.g., as the UE may postpone communications associated with the first SIM until communications with the second SIM have completed).

In some cases, the UE may experience further delays if the communication opportunities overlap with one another in the time domain. For example, a transmission opportunity (e.g., a random access occasion) associated with a first SIM may overlap with a reception opportunity (e.g., a paging occasion) associated with a second SIM. That is, the UE may select a random access occasion corresponding to the first SIM based on a signal quality (e.g., a highest signal quality) of a synchronization beam associated with the random access occasion. However, the selected random access occasion may overlap in time with a paging occasion corresponding to the second SIM. In such cases, the UE may prioritize communications associated with the paging occasion and may delay a random access attempt, for instance, until a next random access occasion associated with the synchronization beam occurs (e.g., according to a periodicity of the random access occasion).

To reduce latency and avoid collisions, a dual-SIM UE may select a random access occasion (e.g., select a synchronization beam associated with a random access occasion) that does not overlap in the time domain with a reception opportunity. For example, in addition to or instead of selecting a synchronization beam based on a signal quality of the synchronization beam, the UE may select the synchronization beam based on the associated random access occasion being non-overlapping with the reception opportunity. In some cases, the UE may determine a pool of available synchronization beams that are associated with random access occasions that are non-overlapping with the reception opportunity, and the UE may select the synchronization beam from the pool of available synchronization beams (e.g., based on a signal quality of the synchronization beam, a time delay of the random access occasion, or other criteria). The UE may then be operable to both perform a random access procedure (e.g., a random access channel (RACH) procedure) during the random access occasion and monitor resources during the reception opportunity (e.g., without introducing a delay due to overlap).

Aspects of the disclosure are initially described in the context of wireless communications systems. Aspects of the disclosure are additionally described in the context of a communications opportunity configuration and a process flow. Aspects of the disclosure are further illustrated by and described with reference to apparatus diagrams, system diagrams, and flowcharts that relate to selecting synchronization beams to reduce latency.

FIG. 1 illustrates an example of a wireless communications system 100 that supports selecting synchronization beams to reduce latency in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different RAT).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular RAT (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, devices in the wireless communications system 100, such as a UE 115, may have multiple SIMs to communicate with multiple subscribers (e.g., networks). For example, a UE 115 may have two SIMs, where a first SIM is associated with a first RAT (e.g., NR) and a second SIM is associated with a second RAT (e.g., NR, LTE, wideband code division multiple access (WCDMA), one times radio transmission technology (1×), or the like). The UE 115 may be limited to communications with one SIM at a time, for instance, based on available resources, a radio frequency configuration at the UE 115, or other constraints. In such cases, communication opportunities associated with each respective SIM may collide (e.g., in the time domain). To resolve such collisions, the UE 115 may prioritize communications of a particular type (e.g., associated with a paging occasion) or associated with a particular SIM, and may postpone or delay other (e.g., colliding) communications.

In some examples, these delays may introduce or increase latency. For instance, the UE 115 may have a paging occasion corresponding to the first SIM that overlaps in time with a random access occasion corresponding to the second SIM, where the random access occasion is associated with a synchronization beam. The UE 115 may select the random access occasion based on a signal quality of the synchronization beam associated with the random access occasion. In some cases, the UE 115 may prioritize the paging occasion and may delay performing a random access procedure (e.g., during a random access occasion) until a later random access occasion associated with the same synchronization beam. If the random access occasion is scheduled according to a periodicity, the UE 115 may have to wait a full period (e.g., 80 ms) until the next occurrence of the random access occasion before performing the random access procedure.

According to the techniques described herein, the UE 115 may reduce delays associated with colliding communications opportunities for respective SIMs by selecting occasions that are non-overlapping. For example, the UE 115 may select a random access occasion corresponding to the first SIM by selecting a synchronization beam associated with the random access occasion, where the synchronization beam is selected based on the random access occasion being non-overlapping with a reception opportunity (e.g., a paging occasion) corresponding to the second SIM. In some examples, the UE 115 may select the synchronization beam from a set of available synchronization beams that are each associated with a random access occasion that is non-overlapping with the reception opportunity and that satisfy a signal quality threshold. The UE 115 may select the synchronization beam based on comparing the synchronization beam to the other available synchronization beams. For example, the UE 115 may determine that the selected synchronization beam has a higher signal quality than each of the other available synchronization beam, is associated with a random access occasion that has a shorter time delay than random access occasions associated with the other available synchronization beams, or some combination thereof. The UE 115 may perform a random access procedure using the first SIM during the random access occasion and via the synchronization beam. Additionally, the UE 115 may monitor resources using the second SIM during the reception opportunity.

Figure 2:
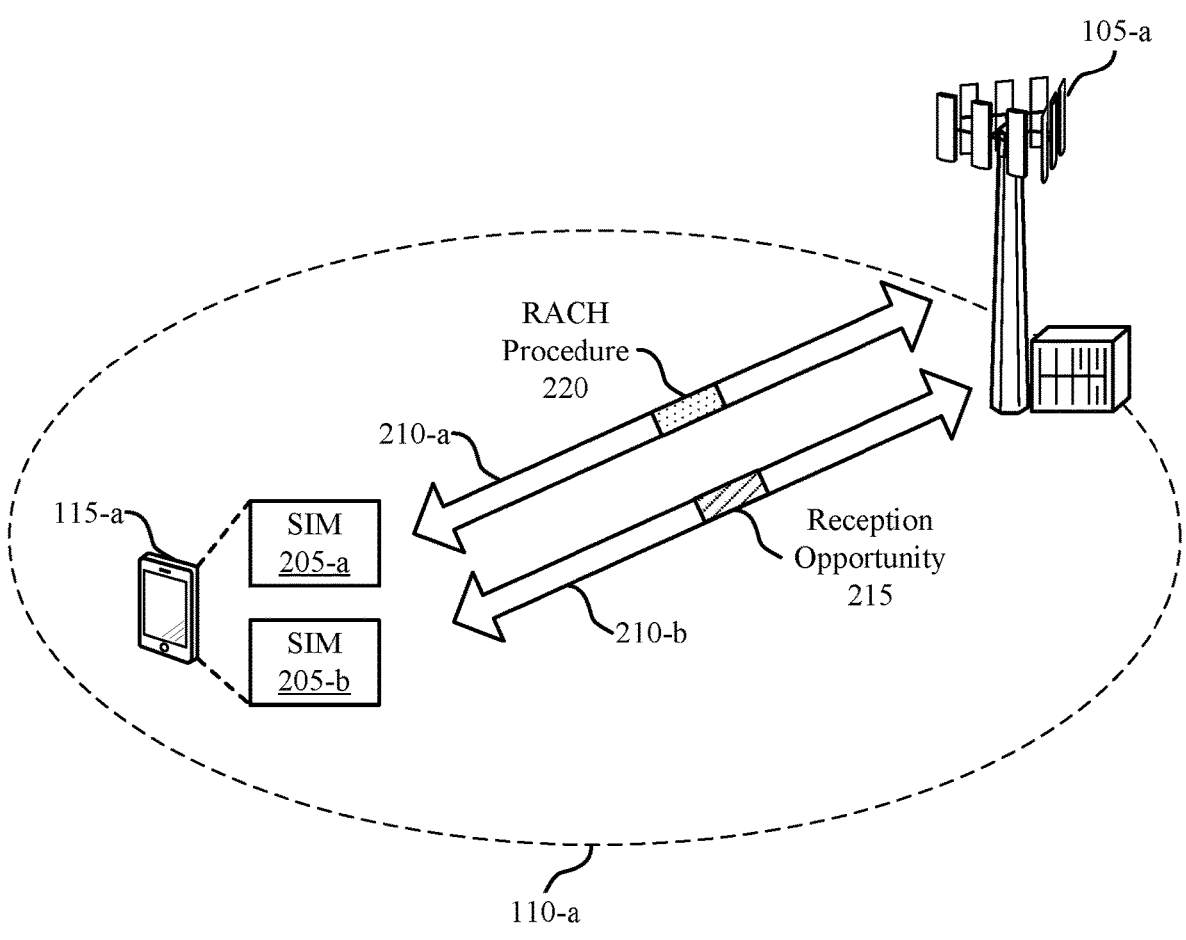
FIG. 2 illustrates an example of a wireless communications system that supports selecting synchronization beams to reduce latency in accordance with aspects of the present disclosure.

FIG. 2 illustrates an example of a wireless communications system 200 that supports selecting synchronization beams to reduce latency in accordance with aspects of the present disclosure. In some examples, wireless communications system 200 may implement aspects of wireless communication systems 100. For example, wireless communications system 200 may include a UE 115-a and a base station 105-a, which may be examples of the corresponding devices described herein. The base station 105-a may serve a coverage area 110-a. The UE 115-a may include a first SIM 205-a and a second SIM 205-b and may use the SIMS 205 to communicate with the base station 105-a on corresponding communication links 210. In the discussion that follows, it is important to note that, while specific examples are contemplated below, the techniques described herein apply to any multitude of SIM arrangements corresponding to any combination of network support. That is, the first and second SIMS 205 may be associated with any example of RAT (e.g., NR, LTE, WCDMA).

The SIMs 205 may each be used by the UE 115-a to communicate, via the base station 105-a, with a respective subscriber and/or network using an associated RAT. In some examples, the SIMs 205 may be associated with the same RAT but different subscribers, or the SIMs 205 may be associated with different RATs and different subscribers. For example, both SIMs 205 may be associated with NR, or the SIM 205-a may be associated with NR and the SIM 205-b may be associated with NR, LTE, WCDMA, or 1x, among other examples. The UE 115-a may use the SIM 205-a and the SIM 205-b to communicate with the base station 105-a via communication link 210-a and the communication link 210-b, respectively.

In some cases, the UE 115-a may be an example of a dual-SIM dual-standby (DSDS) UE 115-a, where the UE 115-a may instruct both SIMS 205 to idle simultaneously or may activate one SIM 205 at a time for dedicated operations. That is, the UE 115-a may transmit or receive during transmission or reception opportunities associated with each respective SIM 205, but may not be capable of communicating using both SIMs 205 simultaneously. For instance, the UE 115-a may have a single radio frequency transmit receive antenna configuration, or may not have sufficient radio frequency components to support a configured number of active frequency bands. In such examples, the UE 115-a may experience conflicts if communications associated with the SIM 205-a collide with communications associated with the SIM 205-b.

As a non-limiting example, the UE 115-a may use the first SIM 205-a to perform, during a random access occasion, a RACH procedure 220 over the communication link 210-a while the second SIM 205-b is in idle discontinuous reception (DRx) mode (e.g., standing by for scheduled wakeups). The UE 115-a may perform the RACH procedure 220 (e.g., may transmit a RACH preamble via the communication link 210-a) using a synchronization beam (e.g., within a synchronization signal block (SSB) and with parameters associated with the synchronization beam) corresponding to the random access occasion. Additionally, the UE 115-a may also monitor resources of the communication link 210-b during a reception opportunity 215 associated with the SIM 205-b. In some examples, the reception opportunity 215 may be an example of a paging occasion or a scheduled wakeup.

In some cases, the UE 115-a may select a random access occasion for performing the RACH procedure 220 based on a signal quality (e.g., signal strength) or a signal quality threshold of the synchronization beam associated with the random access occasion. That is, the UE 15-a may select the random access occasion associated with the synchronization beam having a highest signal quality (e.g., when compared to the remaining synchronization beams associated with other random access occasions). Here, the selected synchronization beam may correspond to a random access occasion that collides (e.g., overlaps) in time with a reception opportunity 215 (e.g., a paging occasion). In cases that the UE 115-a is a DSDS UE, the UE 115-a may be not be configured to utilize both communication opportunities (e.g., transmitting during the random access occasion and receiving during the paging occasion) simultaneously. Thus, the UE 115-a may prioritize the paging occasion and may wait to perform the RACH procedure 220 until a subsequent iteration of the random access occasion. However, in doing so, the RACH procedure 220 may be delayed based on the duration of the random access occasion periodicity (e.g., 80 ms), resulting in increased latency within the network as well as the use of additional power.

As described herein, the UE 115-a may avoid collisions in communication opportunities by selecting a random access opportunity for the RACH procedure 220 corresponding to the SIM 205-a that is non-overlapping with the reception opportunity 215 corresponding to the SIM 205-b. For instance, continuing the example described above, the UE 115-a may select a synchronization beam to use for the RACH procedure 220 based on the synchronization beam being associated with a random access occasion that does not overlap in time with the reception opportunity 215. In some examples, the UE 115-a may determine that multiple synchronization beams are associated with random access occasions that do not overlap in time with the paging occasion, and may select a synchronization beam (e.g., from the multiple synchronization beams) based on additional criteria, such as a signal quality associated with the synchronization beam, a signal threshold, or a time delay associated with the random access occasion, among other examples.

For example, to perform a RACH procedure associated with the SIM 105-a, the UE 115-a may first determine a set of available (e.g., active) synchronization beams (e.g., within a random access period associated with the SIM 105-a) by measuring a signal quality (e.g., a reference signal receive power (RSRP)) associated with each synchronization beam. The UE 115-a may determine a subset of synchronization beams using the measured signal quality, where the subset of synchronization beams includes synchronization beams that satisfy cell selection criterion (e.g., S-criteria). For example, the cell selection criterion may include a signal quality threshold, and the UE 115-a may identify the subset of synchronization beams by determining which synchronization beams of the set of synchronization beams satisfy the signal quality threshold (e.g., has a measured RSRP that is higher than the signal quality threshold).

The UE 115-a may identify the strongest synchronization beam from the subset of synchronization beams (e.g., the synchronization beam that has the highest signal quality $$\left(\text{e.g., } SSB_{RSRP}^{strongest}\right)\right).$$

In some cases, the UE 115-a may compute the differences (e.g., in RSRP) between the strongest synchronization beam and the other synchronization beams in the subset of synchronization beams. For example, the UE 115-a may compute $$\Delta RSRP_i = SSB_{RSRP}^{strongest} - SSB_{RSRP}^i,$$

where i is the index of the synchronization beams that satisfy the cell selection criterion. In some cases, the UE 115-a may further refine the subset of synchronization beams by identifying which of the synchronization beams satisfy additional criteria, such as a value of $\Delta RSRP_i$ that is within a threshold (e.g., $\Delta RSRP_{threshold} < 3$ dB).

The UE 115-a may determine whether each random access occasion associated with each synchronization beam of the subset of synchronization beams overlaps in the time domain with a reception opportunity (e.g., a paging occasion) associated with the SIM 105-b. The UE may select a synchronization beam (e.g., from the subset of synchronization beams) to use for the RACH procedure 220 based on the associated random access occasion being non-overlapping with the reception opportunity. In other words, the UE 115-a may select a synchronization beam to use for the RACH procedure 220 via the communication link 210-a such that there is no collision in time with the reception opportunity 215 via the communication link 210-b.

In some examples, the UE 115-a may select a synchronization beam that is different from the strongest synchronization beam $$\left(\text{e.g., } SSB_{RSRP}^{strongest}\right)$$

based on the strongest synchronization beam overlapping in time with the reception opportunity 215 and the selected synchronization beam being associated with a random access occasion that is non-overlapping with the reception opportunity 215. That is, the UE 115-a may select a synchronization beam that avoids collisions with the reception opportunity 215 despite the synchronization beam having a lower signal quality than $$SSB_{RSRP}^{strongest}.$$

For example, if $$SSB_{RSRP}^{strongest}.$$

is associated with a random access occasion that overlaps with the reception opportunity 215, the UE 115-a may select a synchronization beam with a lower signal quality that is associated with a random access occasion that does not overlap (e.g., and does not cause the UE 115-a to delay the RACH procedure 220).

The UE 115-a may determine that multiple synchronization beams (e.g., of the subset of synchronization beams) are associated with random access occasions that are non-overlapping with the reception opportunity 215. In such cases, the UE 115-a may determine, from the subset of synchronization beams, a second subset of synchronization beams that includes those synchronization beams associated with the non-overlapping random access occasions. The UE 115-a may select a synchronization beam from the second subset based on the synchronization beam satisfying one or more criteria. That is, given multiple synchronization beam candidates that are non-overlapping in time with the reception opportunity 215, the UE 115-a may elect to utilize the synchronization beam candidate with the highest quality, the lowest latency, or some combination thereof. For example, the UE 115-*a* may select the synchronization beam that has the highest signal quality $$\left(\text{e.g., } SSB_{RSRP}^{strongest}, \right.$$

or a smallest ΔRSRP value) of the second subset of synchronization beams. Additionally, or alternatively, the UE 115-*a* may select a synchronization beam from the second subset based on the synchronization beam having a shorter time delay. Put another way, the UE 115-*a* may select a synchronization beam that is associated with a random access occasion that occurs sooner than a random access occasion associated with another synchronization beam.

In some examples, the UE 115-*a* may determine that none of the subset of synchronization beams are associated with random access occasions that are non-overlapping with the reception opportunity 215. Put another way, every synchronization beam of the subset of synchronization beams may be associated with a random access occasion that overlaps with the reception opportunity 215, such that the UE 115-*a* may be unable to avoid a collision between the random access occasion and the reception opportunity 215. In such examples, the UE 115-*a* may select the strongest synchronization beam $$\left(\text{e.g., } SSB_{RSRP}^{strongest}\right)$$

to use for performing a RACH procedure 220 during the associated random access occasion, but may wait to do so until the random access occasion does not overlap with the reception opportunity 215.

The UE 115-*a* may use the selected synchronization beam to perform a RACH procedure 220 using the SIM 205-*a* via the communication link 210-*a*. Additionally, the UE 115-*a* may use the SIM 205-*b* to monitor resources associated with the reception opportunity 215 via the communication link 210-*b*. By selecting the synchronization beam according to the techniques described herein, the UE 115-*a* may avoid collisions and may communicate with the base station 105-*a* using both SIMs 205 without introducing or increasing latency.

Figure 3:
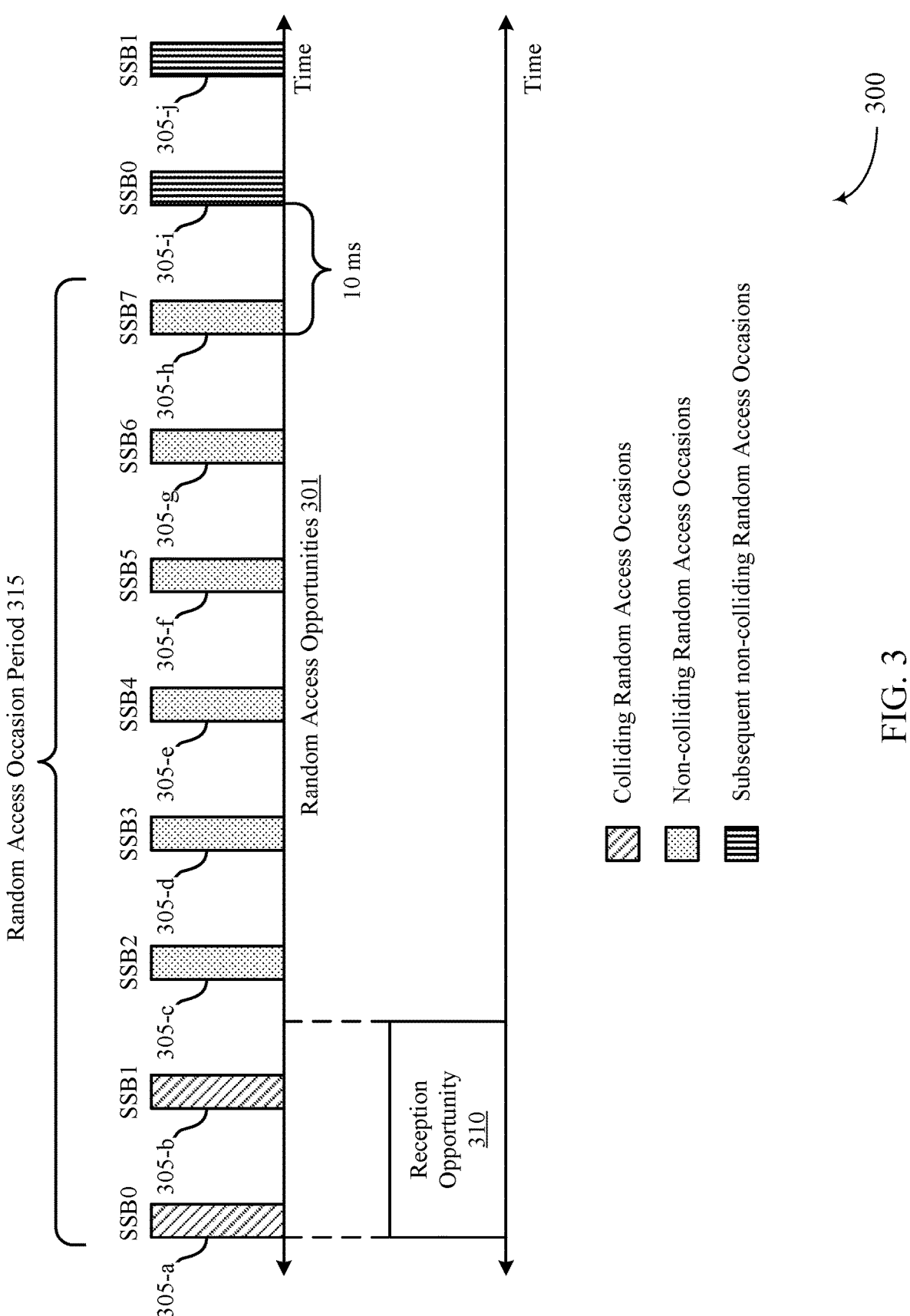
FIG. 3 illustrates an example of a communications opportunity configuration that supports selecting synchronization beams to reduce latency in accordance with aspects of the present disclosure.

FIG. 3 illustrates an example of a communication opportunity configuration 300 that supports selecting synchronization beams to reduce latency in accordance with aspects of the present disclosure. In some examples, the communication opportunity configuration 300 may implement aspects of the wireless communications system as described with reference to FIGS. 1 and 2. For example, the communication opportunity configuration 300 may implemented for communications between a dual-SIM UE and a base station as described herein.

The communication opportunity configuration 300 illustrated in FIG. 3 includes two sets of communication opportunities for a UE configured with a first SIM (e.g., SIM1) and a second SIM (e.g., SIM2). In some cases, the UE may use SIM1 to perform a RACH procedure while SIM2 is idle (e.g., standing by for scheduled wakeups). Accordingly, the random access occasions 305 may correspond to SIM1, and the reception opportunity 310 (e.g., a paging opportunity, a scheduled wakeup) may corresponding to SIM2. The random access occasions 305 may be scheduled according to an random access occasion period 315 such that the random access occasions 305 are periodically received by the UE in a repeating pattern.

During the random access occasion period 315, the UE may be configured with a set of possible random access occasions 305 according to the random access occasion period 315. In the example of FIG. 3, the random access occasion period 315 may be 80 ms such that the UE is configured with eight possible random access occasions 305 within the random access occasion period 315. Each random access occasion 305 may be associated with a synchronization beam (which may be referred to as an SSB); thus, the random access occasion period 315 may include eight possible synchronization beams (e.g., SSB0, SSB1, . . . , SSB7). The random access occasion period 315 may repeat following the final random access occasion 305 (e.g., SSB6, SSB7, SSB0, SSB1).

To perform a RACH procedure, the UE may select a random access occasion 305 by selecting an associated SSB according to the techniques described herein. For example, the UE may determine a subset of the SSBs within the random access occasion period 315 by identifying the subset of the SSBs having a signal quality that exceeds a threshold signal quality. For example, the UE may measure a signal quality (e.g., an RSRP) of each SSB in the random access occasion period 315. Additionally, the UE may determine a threshold signal quality (e.g., based on cell selection criterion), and each of the SSBs within the subset may have a measured signal quality that is above the signal quality threshold. In some examples, the UE may identify the subset of SSBs (e.g., from the set of SSBs within the random access occasion period 315) based on additional criteria, such as an additional signal quality threshold. The UE may, for instance, determine which SSB of the set of SSBs is the strongest (e.g., has the highest signal quality), and may compare the signal quality of the other SSBs to that of the strongest SSB. The UE may identify the subset of SSBs by determining which of those SSBs have a signal quality that is within a threshold (e.g., relative to the signal quality of the strongest SSB).

As illustrated in FIG. 3, however, some SSBs associated with random access occasions 305 may overlap in time with the reception opportunity 310 (e.g., associated with SIM2). In the example of FIG. 3, SSB0 and SSB1 may be associated with colliding random access occasions 305-*a* and 305-*b*, as they occur during the same time as (e.g., overlap with) the reception opportunity 310. SSB2 through SSB1 may associated with be non-colliding random access occasions 305-*c*, 305-*d*, 305-*e*, 305-*f*, 305-*g*, and 305-*h*. Further, subsequent instances of colliding random access occasions 305-*i* and 305-*j* (e.g., in a subsequent random access occasion period 315) may not be in conflict with the reception opportunity 310, as illustrated by subsequent non-colliding random access occasions 305.

If the UE selects an SSB based on signal quality alone (e.g., without considering overlap), the UE may select an SSB that is associated with a random access occasion 305 that collides with the reception opportunity 310 (e.g., a colliding random access occasion 305-*a* or 305-*b*). In such cases, the UE may prioritize the reception opportunity 310, which may delay the RACH procedure until the next random access occasion 305 that is associated with the selected SSB. For example, in FIG. 3, the UE may determine that SSB0 is the strongest SSB. However, because the associated random access occasion 305-*a* is a colliding random access occasion 305-*a*, the UE may not perform the RACH procedure during the colliding random access occasion 305-*a*. Instead, the UE may prioritize the reception opportunity 310 and may reschedule the RACH procedure for the subsequent non-colliding random access occasion 305-*i* that is associated with SSB0. By conducting the RACH procedure after the full duration of the random access occasion period 315, the operations of SIM1, and thus communications associated with SIM1, may be delayed (e.g., by 80 ms in the example of FIG. 3).

According to the techniques described herein, the UE may select an SSB associated with a random access occasion 305 based on the random access occasion 305 being non-overlapping with the reception opportunity 310 (e.g., based on the random access occasion 305 being a non-colliding random access occasion 305). For example, the UE may select an SSB that has a lower signal quality than the strongest SSB based on the strongest SSB being associated with a colliding random access occasion 305 and the selected SSB being associated with a non-colliding random access occasion 305. For example, after determining which available SSBs satisfy the signal quality threshold(s) (e.g., after determining the subset of SSBs), the UE may identify which, if any, SSBs are associated with non-colliding random access occasions 305. If the UE determines that multiple SSBs within the subset are associated with non-colliding random access occasions 305, the UE may select an SSB based on a signal quality (e.g., signal strength) of the SSB, a time delay of the associated random access occasion, or some combination thereof.

As an example, the UE may determine that SSB1 has the highest signal quality of the SSBs in the random access occasion period 315. However, the UE may identify that SSB1 is associated with a colliding random access occasion 305-*b*. The UE may therefore instead identify a set of SSBs that are associated with non-colliding random access occasions 305, such as SSB2 through SSB7. The UE may identify a signal quality of each SSB in the set of SSBs and may select an SSB that has a higher signal quality than each remaining SSB.

Additionally, or alternatively, the UE may identify a time delay associated with each non-colliding random access occasion 305, and may select an SSB that is associated with a non-colliding random access occasion 305 that has a shorter time delay than each remaining non-colliding random access occasion 305. In the example of FIG. 3, the UE may determine that SSB4 has a signal quality that is higher than SSB2, SSB3, SSB5, SSB6, and SSB7. However, the UE may determine that SSB2 is associated with a non-colliding random access occasion 305-*c* that has a shorter time delay than the non-colliding random access occasion 305-*e* associated with SSB4 (e.g., SSB2 is associated with a non-colliding random access occasion 305-*c* that occurs sooner than the non-colliding random access occasion 305-*e* that is associated with SSB4). In some examples, the UE may select SSB2 to use for the RACH procedure based on the shorter time delay, while in other examples, the UE may select SSB4 to use for the RACH procedure based on the higher signal quality.

Based on selecting the SSB, the UE may perform the RACH procedure during the non-colliding random access occasion 305 via the selected SSB. Additionally, the UE may monitor resources associated with the reception opportunity 310. The UE may therefore reduce latency by avoiding delays associated with overlapping communication opportunities for respective SIMs.

Figure 4:
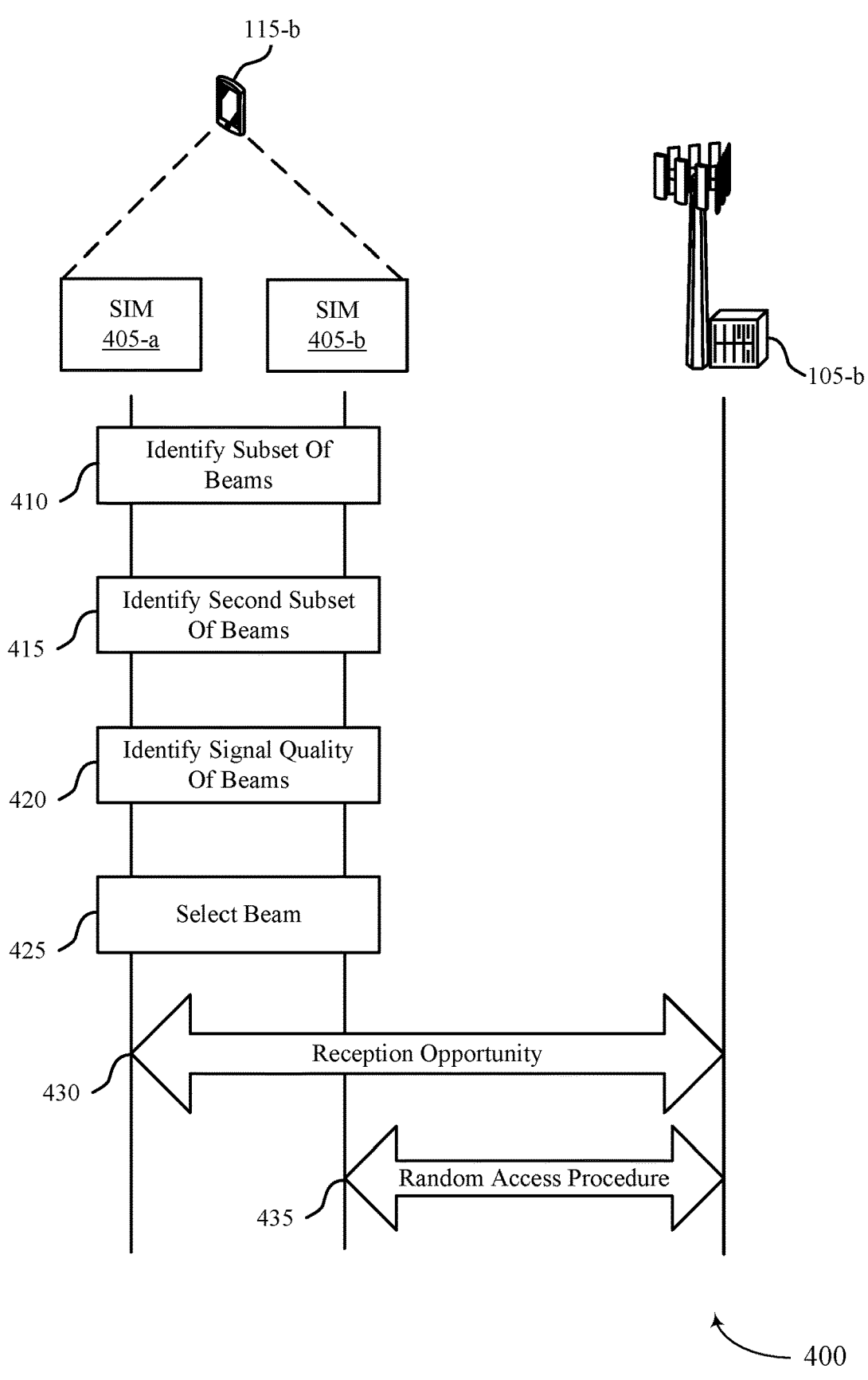
FIG. 4 illustrates an example of a process flow that supports selecting synchronization beams to reduce latency in accordance with aspects of the present disclosure.

FIG. 4 illustrates an example of a process flow 400 that supports selecting synchronization beams to reduce latency in accordance with aspects of the present disclosure. In some examples, the process flow 400 may implement aspects of wireless communications systems 100 or 200. For example, process flow 400 may include a base station 105-*b* and a UE 115-*b*, which may be examples of corresponding wireless devices as described herein. In the following description of the process flow 400, the operations between the UE 115-*b* and the base station 105-*b* may be transmitted in a different order than the order shown, or the operations performed by the UE 115-*b* and the base station 105-*b* may be performed in different orders or at different times. Certain operations may also be left out of the process flow 400, or other operations may be added to the process flow 400. While the UE 115-*b* and the base station 105-*b* are shown performing operations of process flow 400, any wireless device may perform the operations shown. Further, while FIG. 4 illustrates an example of communications between a UE 115-*b* and a base station 105-*b*, the techniques described herein may be applied to communications between any number of wireless devices.

The UE 115-*b* may include two SIMs 405, where each respective SIM 405 may be associated with a RAT. For example, SIM 405-*a* may be associated with NR and SIM 405-*b* may be associated with LTE, NR, WCDM, 1x, or another RAT. The UE 115-*b* may communicate with the base station 105-*b* using the SIMs 405 and in accordance with the associated RATs. For example, the UE 115-*b* may perform a RACH procedure with the base station 105-*b* using the SIM 405-*b* and may communicate with the base station 105-*b* during a reception opportunity using the SIM 405-*a*.

At 410, the UE 115-*b* may identify, from a set of synchronization beams, a subset of synchronization beams. For example, the set of synchronization beams may include synchronization beams that satisfy a signal quality threshold. The UE 115-*b* may identify a signal quality associated with each synchronization beam of the set of synchronization beams, for instance, by measuring an RSRP of each synchronization beam. The UE 115-*b* may compare each identified signal quality with the signal quality threshold. The UE 115-*b* may identify the subset of synchronization beams based on each synchronization beam of the subset of synchronization beams having a signal quality that satisfies (e.g., exceeds) the signal quality threshold.

At 415, the UE 115-*b* may optionally identify a second subset of synchronization beams from the subset of synchronization beams. For example, the UE 115-*b* may identify that each synchronization beam of the second subset is associated with a random access occasion that is non-overlapping with the reception opportunity.

At 420, in some cases, the UE 115-*b* may identify a signal quality associated with each synchronization beam in the subset or the second subset. For example, if the UE 115-*b* identified a second subset of synchronization beams at 415, the UE 115-*b* may identify a signal quality associated with each synchronization beam of the second sub set.

At 425, the UE 115-*b* may select, from the subset identified at 410 (or, in some cases, the second subset identified at 415) a synchronization beam associated with a random access occasion based on the random access occasion being non-overlapping with the reception opportunity. In some examples, the UE 115-*b* may select the synchronization beam based on the synchronization beam having a higher signal quality than each remaining synchronization beam in the subset. In some cases, the UE 115-*b* may select the synchronization beam based on the associated random access occasion having a shorter time delay than the random access occasions associated with each remaining synchronization beam in the subset. In some examples, the UE 115-*b* may have identified (e.g., at 420) a synchronization beam that has a higher signal quality than the selected synchronization beam but is associated with a random access occasion that overlaps with the reception opportunity. In such examples, the UE 115-*b* may select the synchronization beam that is associated with the random access occasion that is non-overlapping with the reception opportunity.

At 430, the UE 115-*b* may monitor, using the SIM 405-*a*, resources associated with the reception opportunity, e.g., based on selecting the synchronization beam. In some cases, the reception opportunity may be an example of a paging opportunity associated with the SIM 405-*a*.

At 435, the UE 115-*b* may perform, using the SIM 405-*a*, the RACH procedure during the random access occasion via the selected synchronization beam.

Figure 5:
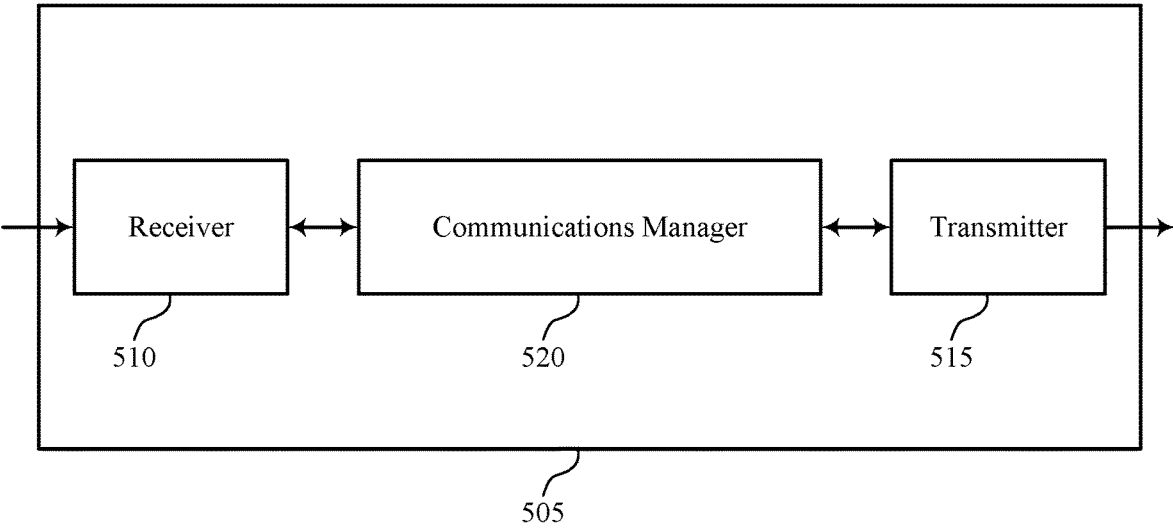
FIGS. 5 and 6 show block diagrams of devices that support selecting synchronization beams to reduce latency in accordance with aspects of the present disclosure.

FIG. 5 shows a block diagram 500 of a device 505 that supports selecting synchronization beams to reduce latency in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to selecting synchronization beams to reduce latency). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to selecting synchronization beams to reduce latency). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of selecting synchronization beams to reduce latency as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for identifying, from a set of synchronization beams and based on a signal quality threshold, a subset of synchronization beams each associated with a random access occasion associated with a first SIM of the UE. The communications manager 520 may be configured as or otherwise support a means for selecting, from the subset of synchronization beams, a first synchronization beam associated with a first random access occasion based on the first random access occasion being non-overlapping with a reception opportunity associated with a second SIM of the UE. The communications manager 520 may be configured as or otherwise support a means for performing, during the first random access occasion, a random access procedure via the first synchronization beam based on the selecting.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for selecting synchronization beams to reduce latency associated with colliding communications in dual-SIM devices. The device 505 may reduce latency by avoiding overlap in transmission and reception opportunities associated with different SIMs. Further, the device 505 may reduce power consumption by avoiding delays that may occur due to overlapping communication opportunities.

Figure 6:
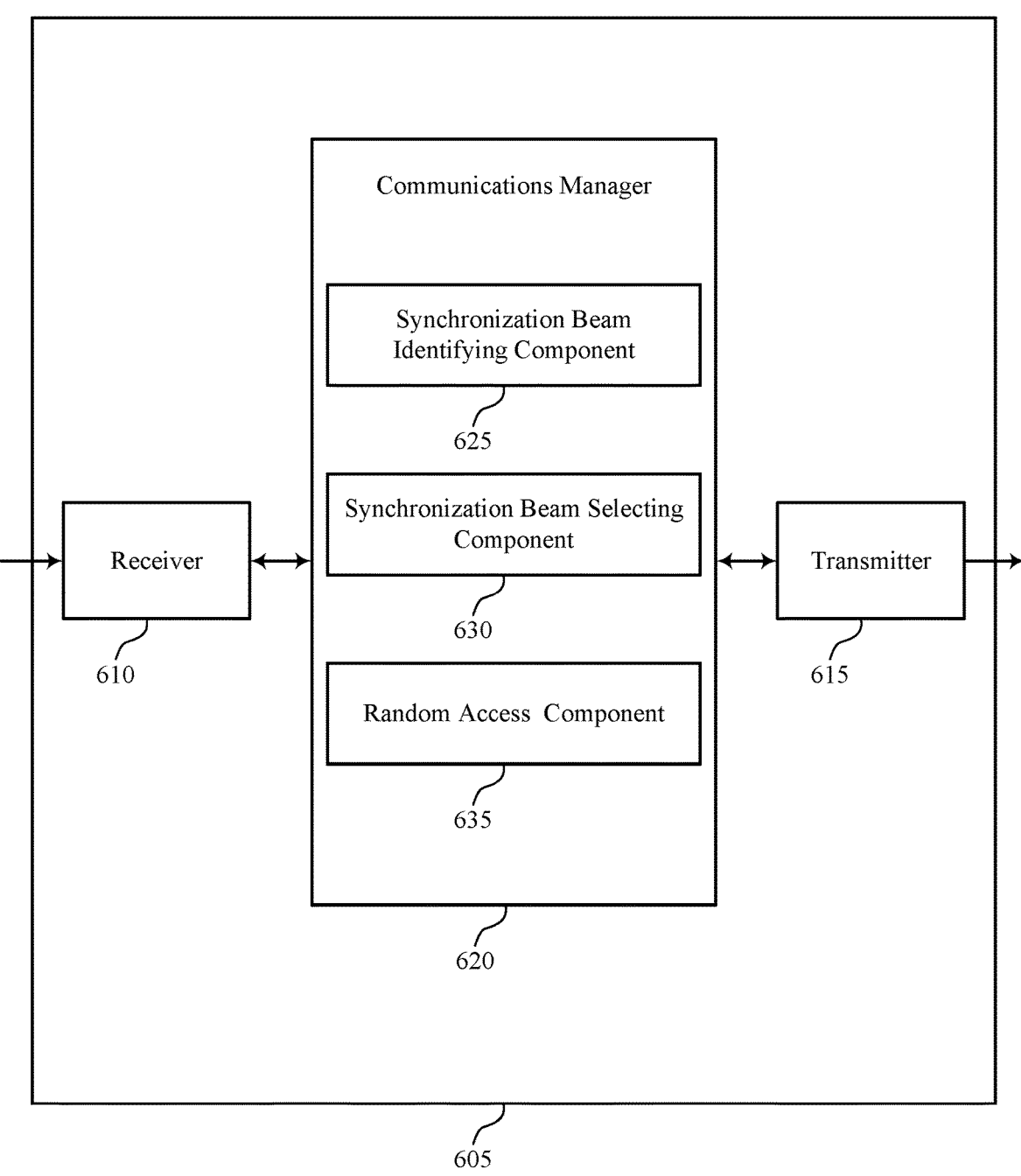

FIG. 6 shows a block diagram 600 of a device 605 that supports selecting synchronization beams to reduce latency in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to selecting synchronization beams to reduce latency). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to selecting synchronization beams to reduce latency). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of selecting synchronization beams to reduce latency as described herein. For example, the communications manager 620 may include a synchronization beam identifying component 625, a synchronization beam selecting component 630, a random access component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The synchronization beam identifying component 625 may be configured as or otherwise support a means for identifying, from a set of synchronization beams and based on a signal quality threshold, a subset of synchronization beams each associated with a random access occasion associated with a first SIM of the UE. The synchronization beam selecting component 630 may be configured as or otherwise support a means for selecting, from the subset of synchronization beams, a first synchronization beam associated with a first random access occasion based on the first random access occasion being non-overlapping with a reception opportunity associated with a second SIM of the UE. The random access component 635 may be configured as or otherwise support a means for performing, during the first random access occasion, a random access procedure via the first synchronization beam based on the selecting.

Figure 7:
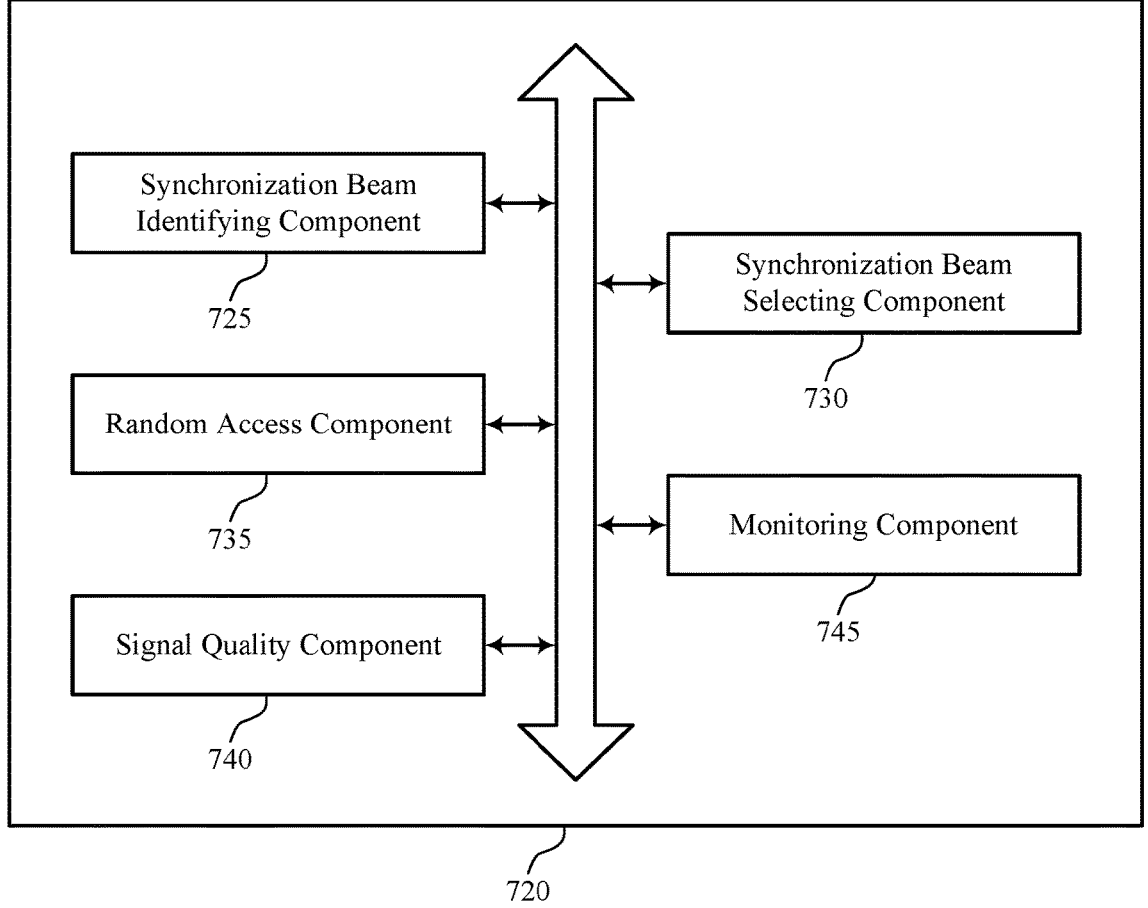
FIG. 7 shows a block diagram of a communications manager that supports selecting synchronization beams to reduce latency in accordance with aspects of the present disclosure.

FIG. 7 shows a block diagram 700 of a communications manager 720 that supports selecting synchronization beams to reduce latency in accordance with aspects of the present disclosure. The communications manager 720 may be an example of aspects of a communications manager 520, a communications manager 620, or both, as described herein. The communications manager 720, or various components thereof, may be an example of means for performing various aspects of selecting synchronization beams to reduce latency as described herein. For example, the communications manager 720 may include a synchronization beam identifying component 725, a synchronization beam selecting component 730, a random access component 735, a signal quality component 745, a monitoring component 750, or any combination thereof. Each of these components may communicate, directly or indirectly, with one another (e.g., via one or more buses).

The communications manager 720 may support wireless communication at a UE in accordance with examples as disclosed herein. The synchronization beam identifying component 725 may be configured as or otherwise support a means for identifying, from a set of synchronization beams and based on a signal quality threshold, a subset of synchronization beams each associated with a random access occasion associated with a first SIM of the UE. The synchronization beam selecting component 730 may be configured as or otherwise support a means for selecting, from the subset of synchronization beams, a first synchronization beam associated with a first random access occasion based on the first random access occasion being non-overlapping with a reception opportunity associated with a second SIM of the UE. The random access component 735 may be configured as or otherwise support a means for performing, during the first random access occasion, a random access procedure via the first synchronization beam based on the selecting.

In some examples, the synchronization beam identifying component 725 may be configured as or otherwise support a means for identifying, from the subset of synchronization beams, a second subset of synchronization beams each associated with random access occasions that are non-overlapping with the reception opportunity, where selecting the first synchronization beam includes selecting the first synchronization beam from the second subset of synchronization beams.

In some examples, to support selecting the first synchronization beam, the synchronization beam selecting component 730 may be configured as or otherwise support a means for selecting the first synchronization beam based on the first synchronization beam having a higher signal quality than each remaining synchronization beam in the second subset of synchronization beams.

In some examples, to support selecting the first synchronization beam, the synchronization beam selecting component 730 may be configured as or otherwise support a means for selecting the first synchronization beam based on the first random access occasion associated with the first synchronization beam having a shorter time delay than random access occasions associated with each remaining synchronization beam in the second subset of synchronization beams.

In some examples, the signal quality component 745 may be configured as or otherwise support a means for identifying a signal quality associated with each synchronization beam of the set of synchronization beams. In some examples, the signal quality component 745 may be configured as or otherwise support a means for comparing the identified signal quality associated with each synchronization beam to the signal quality threshold, where the subset of synchronization beams is identified based on each synchronization beam of the subset of synchronization beams exceeding the signal quality threshold.

In some examples, to support identifying the signal quality associated with each synchronization beam, the signal quality component 745 may be configured as or otherwise support a means for measuring a reference signal receive power associated with each synchronization beam of the set of synchronization beams.

In some examples, the synchronization beam identifying component 725 may be configured as or otherwise support a means for identifying, from the subset of synchronization beams, a second synchronization beam associated with a first signal quality that is higher than a second signal quality associated with the first synchronization beam, where selecting the first synchronization beam is based on the second synchronization beam being associated with a second random access occasion that overlaps with the reception opportunity.

In some examples, the monitoring component 750 may be configured as or otherwise support a means for monitoring, using the second SIM of the UE, resources associated with the reception opportunity based on selecting the first synchronization beam.

In some examples, the first SIM of the UE is associated with an NR RAT. In some examples, the second SIM of the UE is associated with the NR RAT, an LTE RAT, a WCDMA RAT, or a 1x RAT.

In some examples, the reception opportunity includes a paging opportunity associated with the second SIM of the UE.

Figure 8:
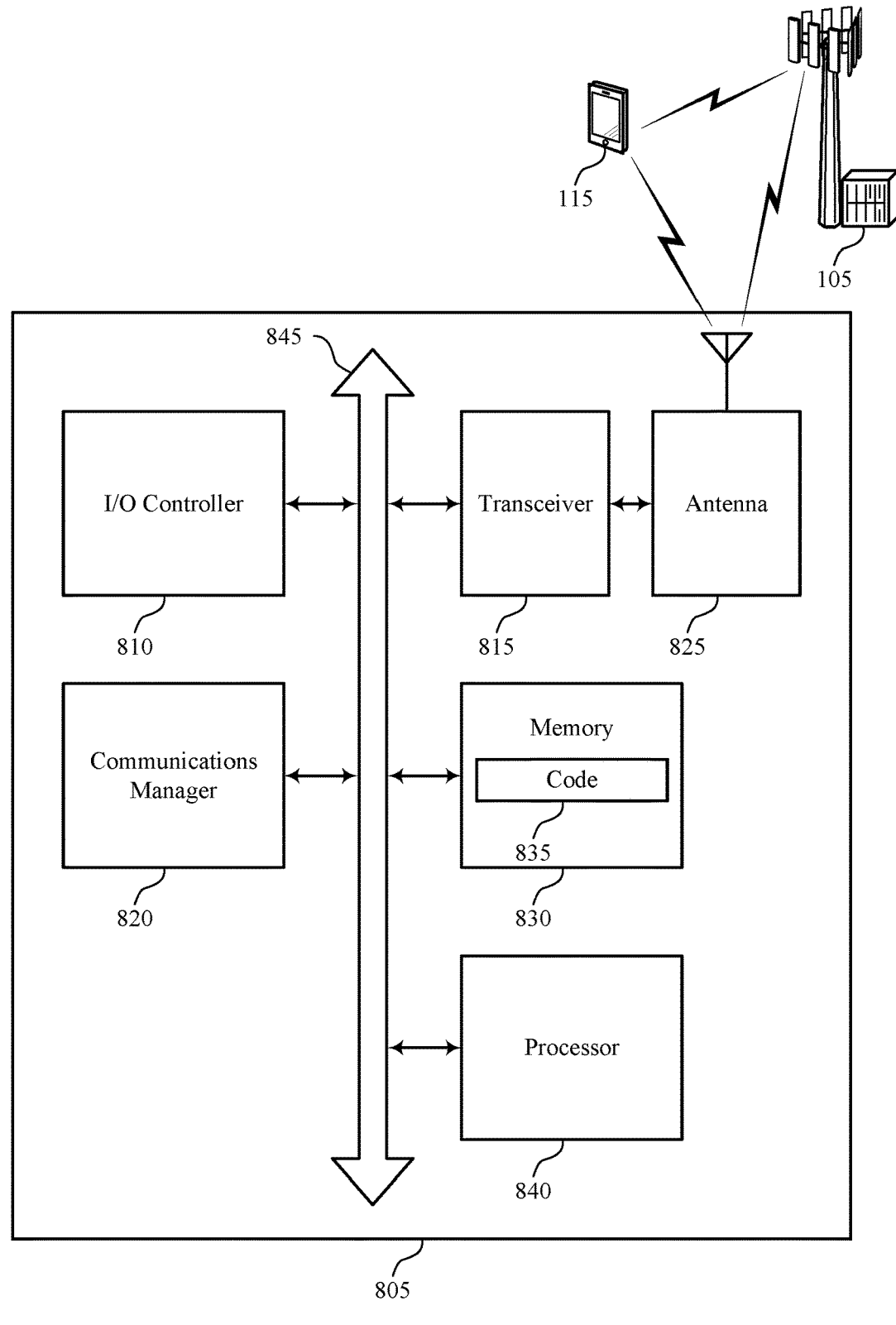
FIG. 8 shows a diagram of a system including a device that supports selecting synchronization beams to reduce latency in accordance with aspects of the present disclosure.

FIG. 8 shows a diagram of a system 800 including a device 805 that supports selecting synchronization beams to reduce latency in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting selecting synchronization beams to reduce latency). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for identifying, from a set of synchronization beams and based on a signal quality threshold, a subset of synchronization beams each associated with a random access occasion associated with a first SIM of the UE. The communications manager 820 may be configured as or otherwise support a means for selecting, from the subset of synchronization beams, a first synchronization beam associated with a first random access occasion based on the first random access occasion being non-overlapping with a reception opportunity associated with a second SIM of the UE. The communications manager 820 may be configured as or otherwise support a means for performing, during the first random access occasion, a random access procedure via the first synchronization beam based on the selecting.

By including or configuring the communications manager 820 in accordance with examples as described herein, the device 805 may support techniques for reducing latency associated with colliding communications in dual-SIM devices. The device 805 may increase communications efficiency and reduce system latency by avoiding overlap in transmission and reception opportunities associated with different SIMs. For example, by selecting a synchronization beam associated with a random access occasion of a first SIM that is non-overlapping with a reception opportunity of a second SIM, the device 805 may reduce delays in performing a RACH procedure, thereby reducing the amount of time the device 805 may wait to connect with a network.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of selecting synchronization beams to reduce latency as described herein, or the processor 840 and the memory 830 may be otherwise configured to perform or support such operations.

FIG. 9 shows a flowchart illustrating a method 900 that supports selecting synchronization beams to reduce latency in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include identifying, from a set of synchronization beams and based on a signal quality threshold, a subset of synchronization beams each associated with a random access occasion associated with a first SIM of the UE. The operations of 905 may be performed in accordance with examples as disclosed herein. In some examples, aspects of the operations of 905 may be performed by a synchronization beam identifying component 725 as described with reference to FIG. 7.

At 910, the method may include selecting, from the subset of synchronization beams, a first synchronization beam associated with a first random access occasion based on the first random access occasion being non-overlapping with a reception opportunity associated with a second SIM of the UE. The operations of 910 may be performed in accordance with examples as disclosed herein. In some examples, aspects of the operations of 910 may be performed by a synchronization beam selecting component 730 as described with reference to FIG. 7.

At 915, the method may include performing, during the first random access occasion, a random access procedure via the first synchronization beam based on the selecting. The operations of 915 may be performed in accordance with examples as disclosed herein. In some examples, aspects of the operations of 915 may be performed by a random access component 735 as described with reference to FIG. 7.

FIG. 10 shows a flowchart illustrating a method 1000 that supports selecting synchronization beams to reduce latency in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include identifying, from a set of synchronization beams and based on a signal quality threshold, a subset of synchronization beams each associated with a random access occasion associated with a first SIM of the UE. The operations of 1005 may be performed in accordance with examples as disclosed herein. In some examples, aspects of the operations of 1005 may be performed by a synchronization beam identifying component 725 as described with reference to FIG. 7.

At 1010, the method may include identifying, from the subset of synchronization beams, a second subset of synchronization beams each associated with random access occasions that are non-overlapping with a reception opportunity associated with a second SIM of the UE. The operations of 1010 may be performed in accordance with examples as disclosed herein. In some examples, aspects of the operations of 1010 may be performed by a synchronization beam identifying component 725 as described with reference to FIG. 7.

At 1015, the method may include selecting, from the second subset of synchronization beams, a first synchronization beam associated with a first random access occasion based on the first random access occasion being non-overlapping with the reception opportunity and based on the first synchronization beam having a higher signal quality than each remaining synchronization beam in the second subset of synchronization beams. The operations of 1015 may be performed in accordance with examples as disclosed herein. In some examples, aspects of the operations of 1015 may be performed by a synchronization beam selecting component 730 as described with reference to FIG. 7.

At 1020, the method may include performing, during the first random access occasion, a random access procedure via the first synchronization beam based on the selecting. The operations of 1020 may be performed in accordance with examples as disclosed herein. In some examples, aspects of the operations of 1020 may be performed by a random access component 735 as described with reference to FIG. 7.

The following provides an overview of aspects of the present disclosure:

Aspect 1: A method for wireless communication at a UE, comprising: identifying, from a set of synchronization beams and based at least in part on a signal quality threshold, a subset of synchronization beams each associated with a random access occasion associated with a first SIM of the UE; selecting, from the subset of synchronization beams, a first synchronization beam associated with a first random access occasion based at least in part on the first random access occasion being non-overlapping with a reception opportunity associated with a second SIM of the UE; and performing, during the first random access occasion, a random access procedure via the first synchronization beam based at least in part on the selecting.

Aspect 2: The method of aspect 1, further comprising: identifying, from the subset of synchronization beams, a second subset of synchronization beams each associated with random access occasions that are non-overlapping with the reception opportunity, wherein selecting the first synchronization beam comprises selecting the first synchronization beam from the second subset of synchronization beams.

Aspect 3: The method of aspect 2, wherein selecting the first synchronization beam comprises: selecting the first synchronization beam based at least in part on the first synchronization beam having a higher signal quality than each remaining synchronization beam in the second subset of synchronization beams.

Aspect 4: The method of any of aspects 2 through 3, wherein selecting the first synchronization beam comprises:

selecting the first synchronization beam based at least in part on the first random access occasion associated with the first synchronization beam having a shorter time delay than random access occasions associated with each remaining synchronization beam in the second subset of synchronization beams.

Aspect 5: The method of any of aspects 1 through 4, further comprising: identifying a signal quality associated with each synchronization beam of the set of synchronization beams; and comparing the identified signal quality associated with each synchronization beam to the signal quality threshold, wherein the subset of synchronization beams is identified based at least in part on each synchronization beam of the subset of synchronization beams exceeding the signal quality threshold.

Aspect 6: The method of aspect 5, wherein identifying the signal quality associated with each synchronization beam comprises: measuring a reference signal receive power associated with each synchronization beam of the set of synchronization beams.

Aspect 7: The method of any of aspects 1 through 6, further comprising: identifying, from the subset of synchronization beams, a second synchronization beam associated with a first signal quality that is higher than a second signal quality associated with the first synchronization beam, wherein selecting the first synchronization beam is based at least in part on the second synchronization beam being associated with a second random access occasion that overlaps with the reception opportunity.

Aspect 8: The method of any of aspects 1 through 7, further comprising: monitoring, using the second SIM of the UE, resources associated with the reception opportunity based at least in part on selecting the first synchronization beam.

Aspect 9: The method of any of aspects 1 through 8, wherein the first SIM of the UE is associated with a NR radio access technology; and the second subscriber identity module of the UE is associated with the NR radio access technology, an LTE radio access technology, a WCDMA radio access technology, or a one times radio transmission technology (1×).

Aspect 10: The method of any of aspects 1 through 9, wherein the reception opportunity comprises a paging opportunity associated with the second SIM of the UE.

Aspect 11: An apparatus for wireless communication at a UE, comprising a processor; memory coupled with the processor; and instructions stored in the memory and executable by the processor to cause the apparatus to perform a method of any of aspects 1 through 10.

Aspect 12: An apparatus for wireless communication at a UE, comprising at least one means for performing a method of any of aspects 1 through 10.

Aspect 13: A non-transitory computer-readable medium storing code for wireless communication at a UE, the code comprising instructions executable by a processor to perform a method of any of aspects 1 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

identifying, from a set of synchronization beams and based at least in part on a signal quality threshold, a subset of synchronization beams each associated with a random access occasion associated with a first subscriber identity module of the UE;

identifying that a first random access occasion associated with a first synchronization beam of the subset of synchronization beams is non-overlapping with a reception opportunity associated with a second subscriber identity module of the UE;

selecting, from the subset of synchronization beams, the first synchronization beam associated with the first random access occasion based at least in part on identifying that the first random access occasion is non-overlapping with the reception opportunity associated with the second subscriber identity module of the UE; and performing, during the first random access occasion, a random access procedure via the first synchronization beam based at least in part on the selecting.

2. The method of claim 1, further comprising:

identifying, from the subset of synchronization beams, a second subset of synchronization beams each associated with random access occasions that are non-overlapping with the reception opportunity, wherein selecting the first synchronization beam comprises selecting the first synchronization beam from the second subset of synchronization beams.

3. The method of claim 2, wherein selecting the first synchronization beam comprises:

selecting the first synchronization beam based at least in part on the first synchronization beam having a higher signal quality than each remaining synchronization beam in the second subset of synchronization beams.

4. The method of claim 2, wherein selecting the first synchronization beam comprises:

selecting the first synchronization beam based at least in part on the first random access occasion associated with the first synchronization beam having a shorter time delay than random access occasions associated with each remaining synchronization beam in the second subset of synchronization beams.

5. The method of claim 1, further comprising:

identifying a signal quality associated with each synchronization beam of the set of synchronization beams; and comparing the identified signal quality associated with each synchronization beam to the signal quality threshold, wherein the subset of synchronization beams is identified based at least in part on each synchronization beam of the subset of synchronization beams exceeding the signal quality threshold.

6. The method of claim 5, wherein identifying the signal quality associated with each synchronization beam comprises:

measuring a reference signal receive power associated with each synchronization beam of the set of synchronization beams.

7. The method of claim 1, further comprising:

identifying, from the subset of synchronization beams, a second synchronization beam associated with a first signal quality that is higher than a second signal quality associated with the first synchronization beam, wherein selecting the first synchronization beam is based at least in part on the second synchronization beam being associated with a second random access occasion that overlaps with the reception opportunity.

8. The method of claim 1, further comprising:
monitoring, using the second subscriber identity module of the UE, resources associated with the reception opportunity based at least in part on selecting the first synchronization beam.

9. The method of claim 1, wherein:
the first subscriber identity module of the UE is associated with a new radio (NR) radio access technology; and
the second subscriber identity module of the UE is associated with the NR radio access technology, a Long Term Evolution (LTE) radio access technology, a wideband code division multiple access (WCDMA) radio access technology, or a one times radio transmission technology (1x).

10. The method of claim 1, wherein the reception opportunity comprises a paging opportunity associated with the second subscriber identity module of the UE.

11. An apparatus for wireless communication at a user equipment (UE), comprising:
a processor;
memory coupled with the processor; and
instructions stored in the memory and executable by the processor to cause the apparatus to:
identify, from a set of synchronization beams and based at least in part on a signal quality threshold, a subset of synchronization beams each associated with a random access occasion associated with a first subscriber identity module of the UE;
identify that a first random access occasion associated with a first synchronization beam of the subset of synchronization beams is non-overlapping with a reception opportunity associated with a second subscriber identity module of the UE;
select, from the subset of synchronization beams, the first synchronization beam associated with the first random access occasion based at least in part on identifying that the first random access occasion is non-overlapping with the reception opportunity associated with the second subscriber identity module of the UE; and
perform, during the first random access occasion, a random access procedure via the first synchronization beam based at least in part on the selecting.

12. The apparatus of claim 11, wherein the instructions are further executable by the processor to cause the apparatus to:
identify, from the subset of synchronization beams, a second subset of synchronization beams each associated with random access occasions that are non-overlapping with the reception opportunity, wherein selecting the first synchronization beam comprises selecting the first synchronization beam from the second subset of synchronization beams.

13. The apparatus of claim 12, wherein the instructions to select the first synchronization beam are executable by the processor to cause the apparatus to:
select the first synchronization beam based at least in part on the first synchronization beam having a higher signal quality than each remaining synchronization beam in the second subset of synchronization beams.

14. The apparatus of claim 12, wherein the instructions to select the first synchronization beam are executable by the processor to cause the apparatus to:
select the first synchronization beam based at least in part on the first random access occasion associated with the first synchronization beam having a shorter time delay than random access occasions associated with each remaining synchronization beam in the second subset of synchronization beams.

15. The apparatus of claim 11, wherein the instructions are further executable by the processor to cause the apparatus to:
identify a signal quality associated with each synchronization beam of the set of synchronization beams; and
compare the identified signal quality associated with each synchronization beam to the signal quality threshold, wherein the subset of synchronization beams is identified based at least in part on each synchronization beam of the subset of synchronization beams exceeding the signal quality threshold.

16. The apparatus of claim 15, wherein the instructions to identify the signal quality associated with each synchronization beam are executable by the processor to cause the apparatus to:
measure a reference signal receive power associated with each synchronization beam of the set of synchronization beams.

17. The apparatus of claim 11, wherein the instructions are further executable by the processor to cause the apparatus to:
identify, from the subset of synchronization beams, a second synchronization beam associated with a first signal quality that is higher than a second signal quality associated with the first synchronization beam, wherein selecting the first synchronization beam is based at least in part on the second synchronization beam being associated with a second random access occasion that overlaps with the reception opportunity.

18. The apparatus of claim 11, wherein the instructions are further executable by the processor to cause the apparatus to:
monitor, using the second subscriber identity module of the UE, resources associated with the reception opportunity based at least in part on selecting the first synchronization beam.

19. The apparatus of claim 11, wherein:
the first subscriber identity module of the UE is associated with a new radio (NR) radio access technology; and
the second subscriber identity module of the UE is associated with the NR radio access technology, a Long Term Evolution (LTE) radio access technology, a wideband code division multiple access (WCDMA) radio access technology, or a one times radio transmission technology (1x).

20. The apparatus of claim 11, wherein the reception opportunity comprises a paging opportunity associated with the second subscriber identity module of the UE.

21. An apparatus for wireless communication at a user equipment (UE), comprising:
means for identifying, from a set of synchronization beams and based at least in part on a signal quality threshold, a subset of synchronization beams each associated with a random access occasion associated with a first subscriber identity module of the UE;
means for identifying that a first random access occasion associated with a first synchronization beam of the subset of synchronization beams is non-overlapping with a reception opportunity associated with a second subscriber identity module of the UE;
means for selecting, from the subset of synchronization beams, the first synchronization beam associated with the first random access occasion based at least in part on identifying that the first random access occasion is non-overlapping with the reception opportunity associated with the second subscriber identity module of the UE; and means for performing, during the first random access occasion, a random access procedure via the first synchronization beam based at least in part on the selecting.

22. The apparatus of claim 21, further comprising:

means for identifying, from the subset of synchronization beams, a second subset of synchronization beams each associated with random access occasions that are non-overlapping with the reception opportunity, wherein selecting the first synchronization beam comprises selecting the first synchronization beam from the second subset of synchronization beams.

23. The apparatus of claim 22, wherein the means for selecting the first synchronization beam comprise:

means for selecting the first synchronization beam based at least in part on the first synchronization beam having a higher signal quality than each remaining synchronization beam in the second subset of synchronization beams.

24. The apparatus of claim 22, wherein the means for selecting the first synchronization beam comprise:

means for selecting the first synchronization beam based at least in part on the first random access occasion associated with the first synchronization beam having a shorter time delay than random access occasions associated with each remaining synchronization beam in the second subset of synchronization beams.

25. The apparatus of claim 21, further comprising:

means for identifying a signal quality associated with each synchronization beam of the set of synchronization beams; and means for comparing the identified signal quality associated with each synchronization beam to the signal quality threshold, wherein the subset of synchronization beams is identified based at least in part on each synchronization beam of the subset of synchronization beams exceeding the signal quality threshold.

26. The apparatus of claim 21, further comprising:

means for identifying, from the subset of synchronization beams, a second synchronization beam associated with a first signal quality that is higher than a second signal quality associated with the first synchronization beam, wherein selecting the first synchronization beam is based at least in part on the second synchronization beam being associated with a second random access occasion that overlaps with the reception opportunity.

27. A non-transitory computer-readable medium storing code for wireless communication at a user equipment (UE), the code comprising instructions executable by a processor to:

identify, from a set of synchronization beams and based at least in part on a signal quality threshold, a subset of synchronization beams each associated with a random access occasion associated with a first subscriber identity module of the UE;

identify that a first random access occasion associated with a first synchronization beam of the subset of synchronization beams is non-overlapping with a reception opportunity associated with a second subscriber identity module of the UE;

select, from the subset of synchronization beams, the first synchronization beam associated with the first random access occasion based at least in part on identifying that the first random access occasion is non-overlapping with the reception opportunity associated with the second subscriber identity module of the UE; and perform, during the first random access occasion, a random access procedure via the first synchronization beam based at least in part on the selecting.

28. The non-transitory computer-readable medium of claim 27, wherein the instructions are further executable by the processor to:

identify, from the subset of synchronization beams, a second subset of synchronization beams each associated with random access occasions that are non-overlapping with the reception opportunity, wherein selecting the first synchronization beam comprises selecting the first synchronization beam from the second subset of synchronization beams.

29. The non-transitory computer-readable medium of claim 28, wherein the instructions to select the first synchronization beam are executable by the processor to:

select the first synchronization beam based at least in part on the first synchronization beam having a higher signal quality than each remaining synchronization beam in the second subset of synchronization beams.

30. The non-transitory computer-readable medium of claim 27, wherein the instructions are further executable by the processor to:

identify a signal quality associated with each synchronization beam of the set of synchronization beams; and compare the identified signal quality associated with each synchronization beam to the signal quality threshold, wherein the subset of synchronization beams is identified based at least in part on each synchronization beam of the subset of synchronization beams exceeding the signal quality threshold.

\* \* \* \* \*